Patented Mar. 6, 1923.

1,447,465

UNITED STATES PATENT OFFICE.

HEINRICH GASSMANN, OF HERRENALB, GERMANY.

PROCESS FOR THE PRODUCTION OF LASTING MASSES MADE FROM VISCOSE.

No Drawing. Application filed December 31, 1920. Serial No. 434,402.

*To all whom it may concern:*

Be it known that I, HEINRICH GASSMANN, a citizen of the German Republic, residing at Herrenalb, Germany, have invented certain new and useful Processes for the Production of Lasting Masses Made from Viscose (for which I have filed applications in Germany December 12, 1919); and I do hereby declare the following to be a full, clear, and exact description of the invention, such as will enable others skilled in the art to which it appertains to make and use the same.

In order to give special lastingness or special specific properties to artificial masses made from viscose, for example in order to make them softer or more elastic or water repulsing and the like, it has already been proposed, to incorporate in said material oils, resins and other impregnating substances by adding the same to the viscose before the coagulation when it is still in liquid state. No practically useful results have been obtained in this manner principally for the reason that such substances were partly or entirely squeezed out again in consequence of the strong contraction of the viscose when hardening.

Experiments have shown that these inconveniences can be obviated by incorporating the impregnating substances in the viscose when the same has already coagulated, the viscose being preferably heated, submitted to pressure or treated in any similar manner.

The working method can be executed for example in such a manner that the coagulated viscose is immersed in a receptacle filled with oil or with any other impregnating substance, adapted to be heated. Or, when the viscose is in the form of plates, the plates can be treated between hot cylinders, the liquid or liquefied impregnating substance being added in drops.

In order to influence in this manufacturing process the properties of the artificial masses, made from viscose, before the impregnating begins and with regard to elasticity, durability and the like, one proceeds, according to this invention, in the following manner.

The viscose, which has already been brought to coagulation in any form whatsoever, but which is not yet decomposed or not yet decomposed completely, is first submitted to a drying process which is carried through in avoiding completely or partly the shrinking. It is known that coagulated viscose, left to itself, undergoes a considerable shrinking or deformation in all directions owing to the strong evaporation of liquid. The invention consists in this that this shrinking is limited in certain ways as will be explained from the following examples.

*Example No. I.*—The viscose produced in the usual manner from alkali-cellulose and carbon bisulphide is pored upon glass plates which are loosely mounted in strong wooden frames and retained upon the back of the frame by means of bars.

The viscose is left to coagulate, the coagulation being eventually accelerated by heating. The bars are now loosened and the glass plates removed from the back of the frame so that the frames are merely filled by the thin plates of coagulated viscose adhering to the wood. These plates of viscose are subjected to a drying process while attached to the frames, preferably by increasing the temperature, so that the plates (being prevented by the frames from contracting) will be subjected to a very strong tension, resulting in the desired elasticity or plasticity.

The plates, either after they have been separated from the frames or better, still adhering to the frames can be submitted to further treatment, e. g., washing out, drying and so on.

*Example No. II.*—The viscose is coagulated to form a block in the well known manner in a receptacle of rectangular or other shape, the block thus formed being clamped in at two opposite edges between clamping frames which are pressed together by means of winged screws or the like. Without the clamping frames the block would considerably shrink or deform when drying. This is however prevented by the clamping frames and tensions are produced in the mass in the same manner as in the plates produced according to Example No. I. The drying process, which so to say, is a completion of the coagulation, is preferably caused through increased temperature. The mass can now be submitted to further treatment as usual.

The washing of the viscose which has already coagulated can further be effected according to this invention with a salt solution, preferably under heating instead of with water.

The viscose contains, as is generally known, considerable quantities of by-products soluble in water, besides caustic soda and carbonate of sodium, principally thiocarbonate, sulphide, polysulphide, etc. For the manufacture of artificial masses from viscose one has proceeded hitherto generally in such a manner that the coagulated viscose was freed from the impurities mentioned by washing it out with water. There were obtained however only bad brittle masses unsuitable for most purposes.

Experiments have shown that much better results are obtained if the washing out of the impurities is not effected with water but with a salt solution. The effect is perhaps best explained by the fact that the salt prevents an extensive swelling of the mass, whilst, as long as the mass is not yet completely fixed or decomposed, that is to say transformed into hydrate of cellulose, an extraordinarily strong swelling of the mass is caused by the water alone, so that when the loose material dries a product is formed, the inner construction of which possesses only little stability. Only when the viscose (at or after the treatment with salt) is thoroughly fixed or transformed into hydrate of cellulose, the washing out with water can be finished, that is to say the remaining salt solution can be removed as at this stage the water causes only a much less amount of swelling.

The process can be executed simply in such a manner that the coagulated viscose which for example has the shape of a plate is immersed in a solution of common salt which is then heated up to the boiling point. If necessary, the salt solution is repeatedly renewed. The plates are then taken out of the salt solution and washed in water to be submitted to any further treatment in the usual manner.

Salt solutions have already been used for the washing out of viscose but only with simultaneous precipitation of the viscose by the salt solution, e. g., in the manufacture of films or when the so called dry viscose is produced which has to be dissolved again. In contradistinction with this procedure the viscose is treated with salt solution according to this process when it has already coagulated and is in the shape of plates, blocks, strips, rods or the like, the treatment being applied where hitherto water alone was used for washing.

It is evident that in the artificial masses made from viscose substances, colouring substances or other liquid or solid substances can be incorporated with a view to obtain a special effect, e. g., for increasing the softness or the elasticity or the like.

I claim:

1. An improved process for the production of lasting masses from viscose consisting in treating viscose which has already coagulated with a water-repellent substance in the presence of heat.

2. An improved process for the production of lasting masses from viscose consisting in treating viscose which has already coagulated with an oleaginous substance in the presence of heat.

3. An improved process for the production of lasting masses from viscose consisting in treating viscose which has already coagulated with a water-repellent substance while the viscose is heated and submitting the coagulated viscose before it has completely decomposed to a drying process carried out without permitting substantial shrinking of the viscose mass.

4. An improved process for the production of lasting masses from viscose consisting in treating viscose which has already coagulated with a water repellent substance while the viscose is heated, submitting the coagulated viscose before it has completely decomposed to a drying process carried out without permitting material shrinking of the viscose mass, and then treating the dried viscose with a salt solution.

5. An improved process for the production of lasting masses from viscose consisting in treating viscose which has already coagulated with a water-repellent substance while the viscose is heated, submitting the coagulated viscose before it has completely decomposed to a drying process carried through while avoiding the shrinking of the viscose to the desired degree, and then treating the dried non-shrunk viscose with a salt solution in the presence of heat.

In testimony whereof I hereunto affix my signature in the presence of two witnesses.

HEINRICH GASSMANN.

Witnesses:
 VALENTIN HOTTENROTH,
 MARTIN STEFFAN.